United States Patent [19]

Zias

[11] Patent Number: 5,072,167

[45] Date of Patent: Dec. 10, 1991

[54] AUTOPOLARITY BATTERY CHARGER

[75] Inventor: Joseph M. Zias, Cuba, N.Y.

[73] Assignee: Acme Electric Corporation, East Aurora, N.Y.

[21] Appl. No.: 527,100

[22] Filed: May 22, 1990

[51] Int. Cl.⁵ .................................................. H02J 7/10
[52] U.S. Cl. ............................................. 320/26; 320/2
[58] Field of Search ................................. 320/2, 25/26

[56] References Cited

U.S. PATENT DOCUMENTS 4,361,795 11/1982 Santilli .................................. 320/26

Primary Examiner—R. J. Hickey

Attorney, Agent, or Firm—Pearne, Gordon, McCoy & Granger

[57] ABSTRACT

Two SCR full-wave center-tappered rectifiers are connected in opposite polarity to battery charging terminals. The proper polarity rectifier is selected by a battery polarity sensing circuit that enables the firing of the SCRs of the proper rectifier. The sensing circuit has two transistors of opposite polarity. The transistor matching the polarity of the battery turns on and enables current to the proper SCR gates. The sensing circuit is controlled by an optical isolator that activates the circuit by shorting the polarized output of a diode bridge connected in the transistors's emitter circuit. This allows the optical isolator to control emitter current of either polarity.

2 Claims, 2 Drawing Sheets

AUTOPOLARITY BATTERY CHARGER

BACKGROUND OF THE INVENTION

The present invention relates to a battery charger and, in particular, to a battery charger that automatically provides the correct polarity current to the battery independent of the terminal connections.

Users of battery chargers often connect the battery charger to the battery to be charged with the wrong polarity terminals connected. This can damage the charger, the battery or both. Various devices have been proposed to prevent this problem. U.S. Pat. Nos. 3,781,631 and 3,857,082 show battery chargers that detect reverse polarity and disable the charger's current output in response.

While protecting the battery and charger, this method requires the user to recognize the problem and to reverse the connections.

U.S. Pat. No. 4,876,496 shows a battery charger that automatically steers the charging current to the correct polarity terminals. A separate full-wave center-tapped rectifier supplies the charging current to an SCR switching network controlled by a battery polarity sensing circuit. The SCR network only routes the current, which has already been converted from a.c. to d.c.

SUMMARY OF THE INVENTION

The present invention utilizes dual rectifier circuits, each of a different polarity. A battery polarity sensing circuit selects the correct polarity rectifier circuit for charging the battery.

The charger comprises an a.c. to d.c. converter having a first rectifier circuit of one polarity and a second rectifier circuit if another polarity, each rectifier circuit having a control input.

Also included is a pair of charging terminals connected to the converter and a battery polarity sensing circuit connected to the charging terminals and to the control inputs. The sensing circuit is adapted to activate the rectifier circuit having the same polarity as the battery, whereby connection of the charging terminals to the battery results in current of the correct polarity being applied to the battery.

In the preferred embodiment the a.c. to d.c. converter additionally has a center-tapped transformer and each rectifier circuit comprises a pair of SCRs in a full-wave center-tapped rectifier configuration.

In addition, the polarity sensing circuit in the preferred embodiment comprises a transistor of a first polarity having a control input and an output. The first transistor control input is connected in a series relationship with one of the charging terminals and the first output is connected in series relationship with the first rectifying circuit control input. The polarity sensing circuit also comprise a transistor of a second polarity having a control input and an output. The second transistor control input is connected in series relationship with the same charging terminal and the second output is connected in series relationship with the second rectifier circuit control input. The polarity of the charging terminals determines which of the transistors is in a conducting state.

DESCRIPTION OF THE PREFERRED EMBODIMENTS

Figure 1:
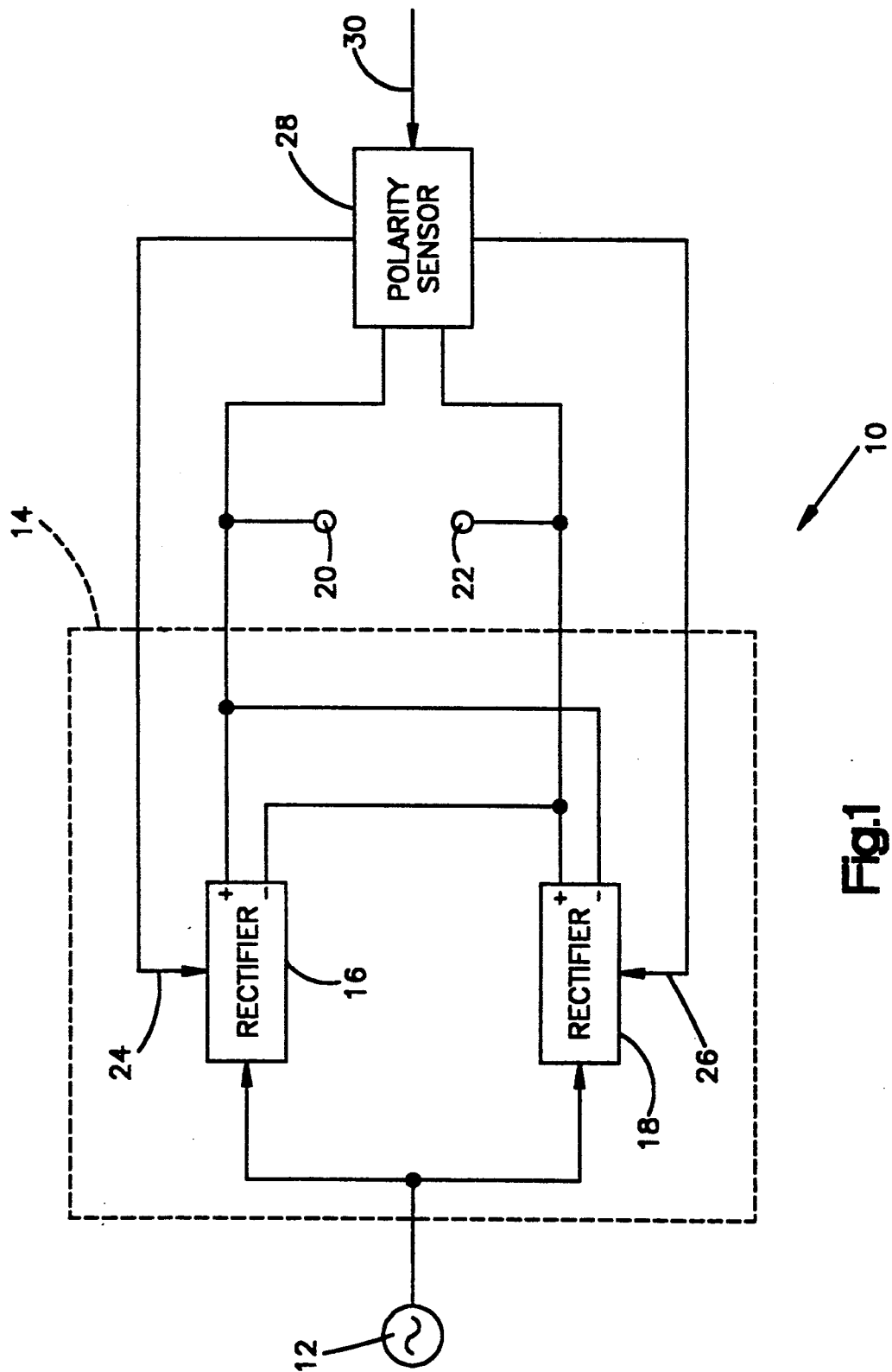
FIG. 1 is a block diagram of a battery charger according to the invention.

Referring to FIG. 1, a battery charger 10 according to the invention is shown.

An a.c. source 12 is connected to an a.c. to d.c. converter 14. The converter 14 contains two rectifier circuits 16, 18. The a.c. source 12 supplies power to both of the rectifier circuits 16, 18.

The rectifier circuits 16, 18 are connected in opposite polarity to the charging terminals 20, 22. The rectifier circuits 16, 18 are controlled by the control inputs 26, 26, respectfully.

A polarity sensor circuit 28 is also attached across the charging terminals 20, 22 and provides control signals to the control inputs 24, 26. A control input 30 enables and disables the polarity sensor circuit 28.

In operation, the terminals of a battery (not shown) are connected across the charging terminals 20, 22. As long as the polarity sensor circuit 28 is activated by the control signal 30, the polarity sensor circuit 28 determines the polarity of the battery and activates the correct one of the rectifier circuits 16, 18. In this way, the correct polarity charging current is provided to the battery independently to the polarity of the connections of the charging terminals 20, 22 to the battery's terminals.

If the polarity sensor circuit is disabled by the control input 30, no current is applied to the charging terminals 20, 22 by the a.c. to d.c. converter 14.

Figure 2:
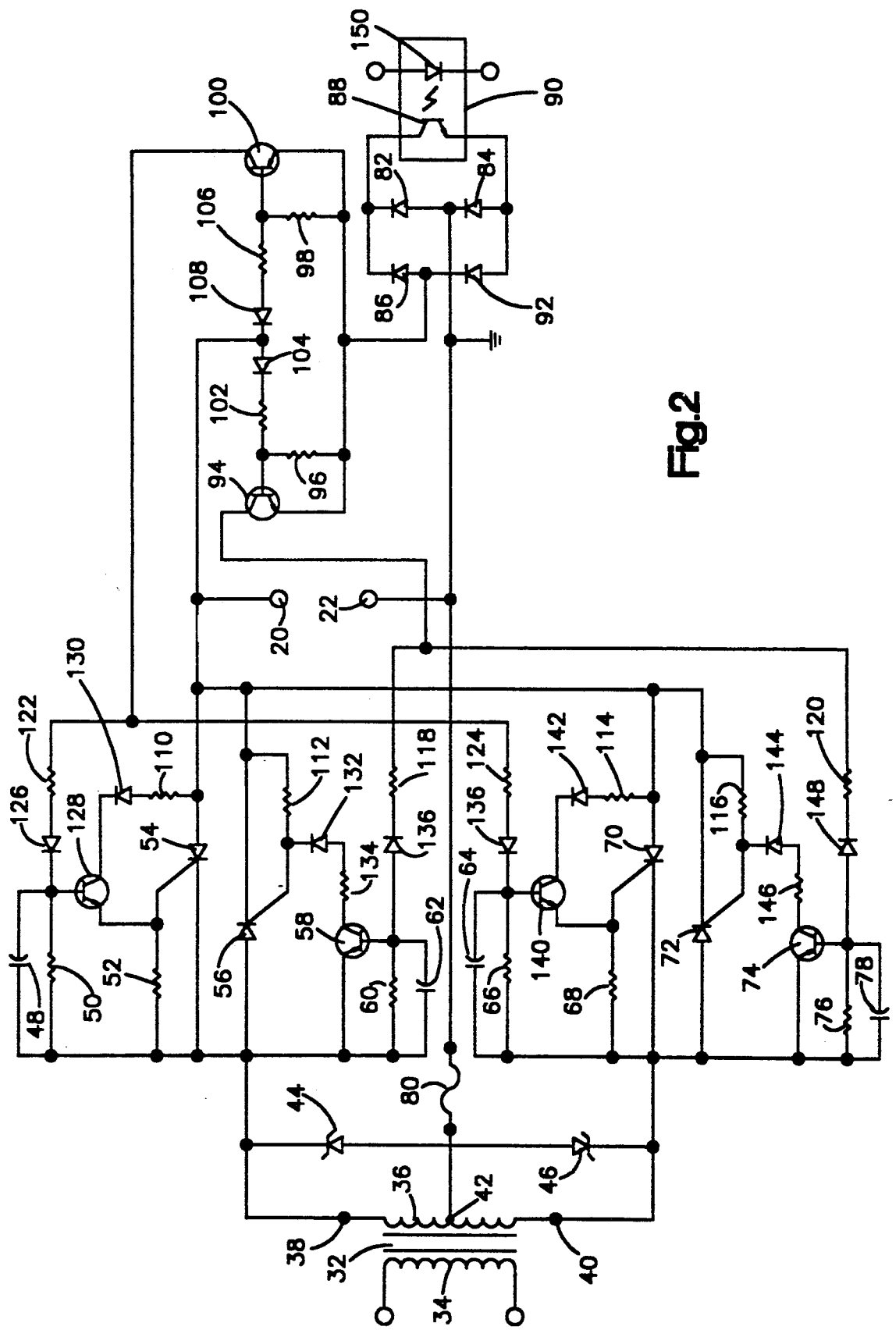
FIG. 2 is a schematic diagram of a battery charger according to the invention.

Referring to FIG. 2, a schematic diagram of the preferred embodiment of the invention is shown.

A center-tapped transformer 32 has a primary winding 34 and a secondary winding 36. The secondary winding 36 has end taps 38, 40 and a center tap 42. The primary winding 34 would normally be connected across an a.c. source (not shown). Zener diodes 44, 46 are connected across the secondary winding 36 for over-voltage protection.

The end tap 38 is connected to the first terminal of a capacitor 48, the first terminal of a resistor 50, the first terminal of a resistor 52, the cathode of an SCR 54, the anode of an SCR 56, the emitter of a pnp transistor 58, the first terminal of a resistor 60 and the first terminal of a capacitor 62.

The end tap 40 is connected to the first terminal of a capacitor 64, the first terminal of a resistor 66, the first terminal of a resistor 68, the cathode of an SCR 70, the anode of an SCR 72, the emitter of a pnp transistor 74, the first terminal of a resistor 76 and the first terminal of a capacitor 78.

The center tap 42 is connected through a fuse 80 to the charging terminal 22 and to the anode of the diode 82 and the cathode of the diode 84.

The cathode of the diode 82 is connected to the cathode of the diode 86 and to the collector of the phototransistor 88 in optical isolator 90. The emitter of the phototransistor 88 is connected to the anodes of the diodes 84, 92. The anode of the diode 86 is connected to the cathode of the diode 92, the emitter of an npn transistor 94, the first terminal of a resistor 96, the first terminal of a resistor 98 and the emitter of a pnp transistor 100.

The base of the transistor 94 is connected to the second terminal of the resistors 96 and to the first terminal of the resistor 102. The second terminal of the resistor 102 is connected to the cathode of a diode 104.

The base of the transistor 100 is connected to the second terminal of the resistor 98 and to the first terminal of the resistor 106. The second terminal of the resistor 106 is connected to the anode of a diode 108.

The anode of the diode 104 and the cathode of the diode 108 are connected to the charging terminal 20, the first terminal of a resistor 110, the anode of the SCR 54, the cathode of the SCR 56, the first terminal of a resistor 112, the first terminal of a resistor 114, the anode of the SCR 70, the cathode of the SCR 72 and the first terminal of a resistor 116.

The collector of the transistor 94 is connected to the first terminal of a resistor 118 and the first terminal of a resistor 120.

The collector of the transistor 100 is connected to the first terminals of a resistor 122 and the first terminal of a resistor 124.

The second terminal of the resistor 122 is connected to the anode of the diode 126. The cathode of the diode 126 is connected to the second terminal of the capacitor 48, the second terminal of the resistor 50, and the base of an npn transistor 128. The collector of the transistor 128 is connected to the cathode of a diode 130. The anode of the diode 130 is connected to the second terminals of the resistor 110. The emitter of the transistor 128 is connected to the second terminal of the resistor 52 and the gate of the SCR 54.

The second terminal of the resistor 112 is connected to the cathode of a diode 132 and the gate of the SCR 56. The anode of the diode 132 is connected to the first terminal of a resistor 134. The second terminal of the resistor 134 is connected to the collector of the transistor 58. The second terminal of the resistor 118 is connected to the cathode of a diode 136. The anode of the diode 136 is connected to the base of the transistor 58, the second terminal of the resistor 60 and the second terminal of the capacitor 62.

The second terminal of the resistor 124 is connected to the anode of a diode 136. The cathode of the diode 136 is connected to the second terminal of the capacitor 64, the second terminal of the resistor 66 and the base of an npn transistor 140. The collector of the transistor 140 is connected to the cathode of a diode 142. The anode of the diode 142 is connected to the second terminal of the resistor 114. The emitter of the transistor 140 is connected to the second terminal of the resistor 68 and the gate of the SCR 70.

The second terminal of the resistor 116 is connected to the cathode of a diode 144 and the gate of SCR 72. The anode of the diode 144 is connected to the first terminal of a resistor 146. The second terminal of the resistor 146 is connected to the collector of the transistor 74. The second terminal of the resistor 120 is connected to the cathode of a diode 148. The anode of the diode 148 is connected to the base of the transistor 74, the second terminal of the resistor 76 and the second terminal of the capacitor 78.

In operation, the terminals of a battery are connected across the charging terminals 20, 22. If the LED 150 in the optical isolator 90 is not energized no current flows through the battery.

If the LED 150 is energized (e.g., by an unshown current source) the phototransistor 88 conducts. This shorts the polarized output of the diode bridge formed by the diodes 82, 84, 86, 92. As a result, the emitters of the transistors 94, 100 are effectively directly connected to the charging terminal 22, independent of the polarity of the battery connection.

If the battery's positive terminal is connected to the charging terminal 20, battery current flows through the diode 104 and the resistor 102 to the base of the transistor 94, turning the transistor 94 on. In the meantime, the diode 108 blocks current to the base of the transistor 100.

When the transistor 94 is conducting, positive current from the end tap 38 flows through the diode 136, allowing the transistor 58 to turn on. Current from the transistor 58 then fires the SCR 56, which then applies positive charging current from the end tap 38 to the charging terminal 20.

Similarly, when the transistor 94 is conducting, positive current from the end tap 40 flows through the diode 148, allowing the transistor 74 to turn on. Current from the transistor 74 then fires the SCR 72, which then applies positive charging current from the end tap 40 to the charging terminal 20.

In the meantime, the center tap 42 provides the negative return path from the charging terminal 22.

In this polarity configuration, the SCRs 56, 72 are effectively operating as part of a full-wave center-tapped rectifier supplying positive current to the charging terminal 20. If, on the other hand, the battery's negative terminal is connected to the charging terminal 20, battery current flows through the diode 108 and the resistor 106 to the base of the transistor 100, turning the transistor 100 on. In the meantime, the diode 104 blocks current to the base of the transistor 94.

When the transistor 100 is conducting, negative current from the end tap 38 flow through the diode 126, allowing the transistor 128 to turn on. Current from the transistor 128 then fires the SCR 54, which then applies negative charging current from the end tap 38 to the charging terminal 20.

similarly, when the transistor 100 is conducting, negative current from the end tap 40 flows through the diode 136, allowing the transistor 140 to turn on. Current from the transistor 140 then fires the SCR 70, which then applies negative charging current from the end tap 40 to the charging terminal 20.

In the meantime, the center tap 42 provides the positive return path from the charging terminal 22.

In this polarity configuration, the SCRs 54, 70 are effectively operating a part of a full-wave center-tapped rectifier supplying negative current to the charging terminal 20.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed:

1. A charger for a battery, the charger comprising:
   an a.c. to d.c. converter having a center-tapped transformer, a first rectifier circuit of one polarity and a second rectifier circuit of another polarity, each rectifier circuit having a first and a second SCR in a full-wave center-tapped rectifier configuration, each SCR having a gate input circuit;
   a pair of charging terminals connected to said converter; and
   a battery polarity sensing circuit having:

a first transistor of a first polarity including a base, collector and emitter;

a first transistor base input circuit said first transistor base input circuit being connected to one of said charging terminals and said first transistor collector being connected to said first rectifier first and second SCR gate input circuits; and a second transistor of a second polarity including a base, collector and emitter;

a second transistor base input circuit, said second transistor base input circuit being connected to said one of said charging terminals and said second transistor collector being connected to said second rectifier first and second SCR gate input circuits, said sensing circuit being adapted to activate the rectifier circuit having the same polarity as the battery, whereby connection of the charging terminals to the battery results in current of the correct polarity being applied to the battery.

2. A charger for a battery, the charger comprising:

an a.c. to d.c. converter having a center-tapped transformer, a first rectifier circuit of one polarity, each rectifier circuit having a first and a second SCR in a full-wave center-tapped rectifier configuration, the first SCR having a gate input circuit and a positive output terminal and the second SCR having a gate input circuit and a negative terminal;

a first charging terminal connected to the positive output terminal of the first rectifier circuit and to the negative output terminal of the second rectifier circuit;

a second charging terminal connected to the negative output terminal of the first rectifier circuit and to the positive output terminal of the second rectifier circuit;

a first transistor of a first polarity having a base, a collector and an emitter;

a first transistor base control circuit, said first base control circuit being connected to said first charging terminal and said first collector being connected to said SCR gate input circuits of said first rectifier circuit;

a second transistor of a second polarity having a base, a collector and an emitter;

a second transistor base control circuit, said second base control circuit being connected to said first charging terminal and said second collector being connected to said SCR gate input curcuits of said second rectifier circuit;

a diode bridge having a first and a second bipolar terminal and a positive and a negative terminal, said diode bridge first bipolar terminal being connected in series relationship with said first and second emitters, said diode bridge second bipolar terminal being connected in series relationship with said second charging terminal; and an optical isolator having an input and an output said optical isolator output being connected in series relationship between said diode bridge positive and negative terminals, whereby connection of the charging terminals to the battery results in current of the correct polarity being applied to the battery when said optical isolator input is energized.

* * * * *

UNITED STATES PATENT AND TRADEMARK OFFICE
CERTIFICATE OF CORRECTION

PATENT NO. : 5,072,167
DATED : December 10, 1991
INVENTOR(S) : Joseph M. Zias

It is certified that error appears in the above-identified patent and that said Letters Patent is hereby corrected as shown below:

Abstract, line 11, "transistors's" should be --transistors'--.

Column 1, line 36, "if" should be --of--.

Column 2, lines 15 and 16, "26, 26" should be --24, 26--.

Column 4, line 39, "similarly," should be --Similarly,--.

Column 5, line 23, after "polarity" insert --and a second rectifier circuit of another polarity--.

Signed and Sealed this

Eleventh Day of May, 1993

Attest:

MICHAEL K. KIRK

Attesting Officer

Acting Commissioner of Patents and Trademarks